United States Patent
Cheng et al.

(10) Patent No.: US 9,189,116 B2
(45) Date of Patent: Nov. 17, 2015

(54) NOISE COMPENSATING TOUCH PANEL AND TOUCH DEVICE THEREOF

(71) Applicant: ILI TECHNOLOGY CORP., Hsinchu County (TW)

(72) Inventors: Chih-Jen Cheng, Hsinchu (TW); Cheng-Chung Hsu, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 14/088,761

(22) Filed: Nov. 25, 2013

(65) Prior Publication Data
US 2015/0029137 A1 Jan. 29, 2015

(30) Foreign Application Priority Data
Jul. 26, 2013 (TW) .............................. 102126858 A (51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0418* (2013.01)

(58) Field of Classification Search
CPC ........... G06F 3/44; G06F 3/412; G06F 3/416; G06F 2203/4112; G06F 2203/4103; G06F 3/418; G06F 2203/4101; G06F 1/16; G06F 3/45

USPC .................................................. 345/171–178
See application file for complete search history.

(56) References Cited

U.S. PATENT DOCUMENTS

| | | | |
|---|---|---|---|
| 2012/0092297 A1* | 4/2012 | Han | 345/174 |
| 2012/0146941 A1* | 6/2012 | Shin | 345/174 |
| 2013/0106779 A1* | 5/2013 | Company Bosch et al. | 345/174 |

* cited by examiner

*Primary Examiner* — Olga Merkoulova
(74) *Attorney, Agent, or Firm* — Li & Cai Intellectual Property (USA) Office (57) ABSTRACT

A noise compensating touch panel includes a touch module and a signal compensating module. The touch module includes transmission electrodes and sensing electrodes. The signal compensating module has a first input, a second input and an output. The signal compensating module couples to the touch module. The transmission electrodes receive scanning voltage signals sequentially. When the scanning voltage signals sense the touching by object at crossover points of a first transmission electrode and the sensing electrodes, the sensing electrodes provide sensing signals. The sensing signals include the value of a first parasitical capacitor. The second transmission electrode senses the value of a second parasitical capacitor which the second transmission electrode isn't touched by object when the second transmission electrode receives the scanning voltage signals. Then the second transmission electrode provides compensating signals. Signal compensating module receives the sensing signals and the compensating signals separately.

18 Claims, 7 Drawing Sheets

NOISE COMPENSATING TOUCH PANEL AND TOUCH DEVICE THEREOF

BACKGROUND

1. Technical Field

The present disclosure relates to a touch panel; in particular, to a noise compensating touch panel and a touch device thereof.

2. Description of Related Art

In recent years touch panel applications have been developed rapidly, as well as being utilized commonly in, for instance, ATMs, point-of-sale (POS) terminals and household automation control and management systems. Touch panels are even being used extensively in portable electronic devices such as tablet computers and smartphones, etc. A touch panel provides an intuitive input scheme that brings the conventional input interface to a more approachable level. The demand for HMI (human-machine interface) applications has therefore shown rapid growth.

According to the physical principle deployed to detect a touch point, a touch panel can be classified as resistive or capacitive. For a resistive touch panel, voltage is generated when the resistive touch panel is touched by a finger or a stylus. A capacitive touch panel is operated according to a finger contacting the touch panel for absorbing a very small current. The capacitive touch panel can be further classified as surface capacitive or projected capacitive. The projected capacitive touch panels attract industry attention due to its multi-touch capability. If a projected capacitive touch panel is integrated with a LCD to form an in-cell multi-touch panel, or a projected capacitive touch panel is integrated with an upper/lower surface of a panel color filter to form an on-cell multi-touch panel, thinness of the original panel can also be maintained. ITO (Indium Tin Oxide) is commonly used in TFT-LCD (thin-film-transistor liquid-crystal display) for holding electric charges. By reversely operating the same principle, such ITO can also be utilized as a detector, for achieving high-density detection. However, since a thin-film transistor in a TFT-LCD causes significant noise, the accuracy of capacitive sensing is especially important under the effect of such noise.

SUMMARY

An exemplary embodiment of the present disclosure provides a noise compensating touch panel. The noise compensating touch panel comprises a touch module and a signal compensating module. The touch module comprises a plurality of transmission electrodes and a plurality of sensing electrodes. The plurality of transmission electrodes are for sequentially receiving at least one scanning voltage. The plurality of sensing electrodes are for providing at least a sensing signal when the scanning voltage senses an object touching at at least one crossover node of a first transmission electrode and the plurality of sensing electrodes, wherein the sensing signal comprises capacitance of a first parasitic capacitor. When a second transmission electrode receives the scanning voltage, the second transmission electrode senses capacitance of a second parasitic capacitor corresponding to when the second transmission electrode has not been touch by the object, for providing a compensating signal. The signal compensating module is coupled to the touch module. The signal compensating module comprises a first input terminal, a second input terminal and an output terminal, wherein the first input terminal and the second input terminal receive the sensing signal and the compensating signal respectively, for providing a determining voltage at the output terminal.

Another exemplary embodiment of the present disclosure provides a touch device. The touch device comprises a touch panel and a load. The touch panel comprises a touch module and a signal compensating module. The touch module comprises a plurality of transmission electrodes and a plurality of sensing electrodes. The plurality of transmission electrodes are for sequentially receiving at least one scanning voltage. The plurality of sensing electrodes are for providing at least a sensing signal when the scanning voltage senses an object touching at at least one crossover node of a first transmission electrode and the plurality of sensing electrodes, wherein the sensing signal comprises capacitance of a first parasitic capacitor. When a second transmission electrode receives the scanning voltage, the second transmission electrode senses capacitance of a second parasitic capacitor corresponding to when the second transmission electrode has not been touch by the object, for providing a compensating signal. The signal compensating module is coupled to the touch module. The signal compensating module comprises a first input terminal, a second input terminal and an output terminal, wherein the first input terminal and the second input terminal receive the sensing signal and the compensating signal respectively, for providing a determining voltage at the output terminal. The load is coupled to the touch panel, for receiving the determining voltage to operate.

In summary, when the noise compensating touch panel of the present disclosure utilizes scanning voltage to sequentially scan each transmission electrode, the transmission electrode that has not been touched by object senses mutual capacitance noise generated by the common electrodes between the thin-film transistor and the sensing electrode (or the transmission electrode) on the touch panel, for generating a reference compensating signal. The sensing signal removes noise via the compensating signal, for increasing a signal-to-noise ratio of the sensing signal. Consequently an accuracy of determining the touch position for a capacitive sensing touch panel is improved.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

(Embodiments of a Noise Compensating Touch Panel)

Figure 1:
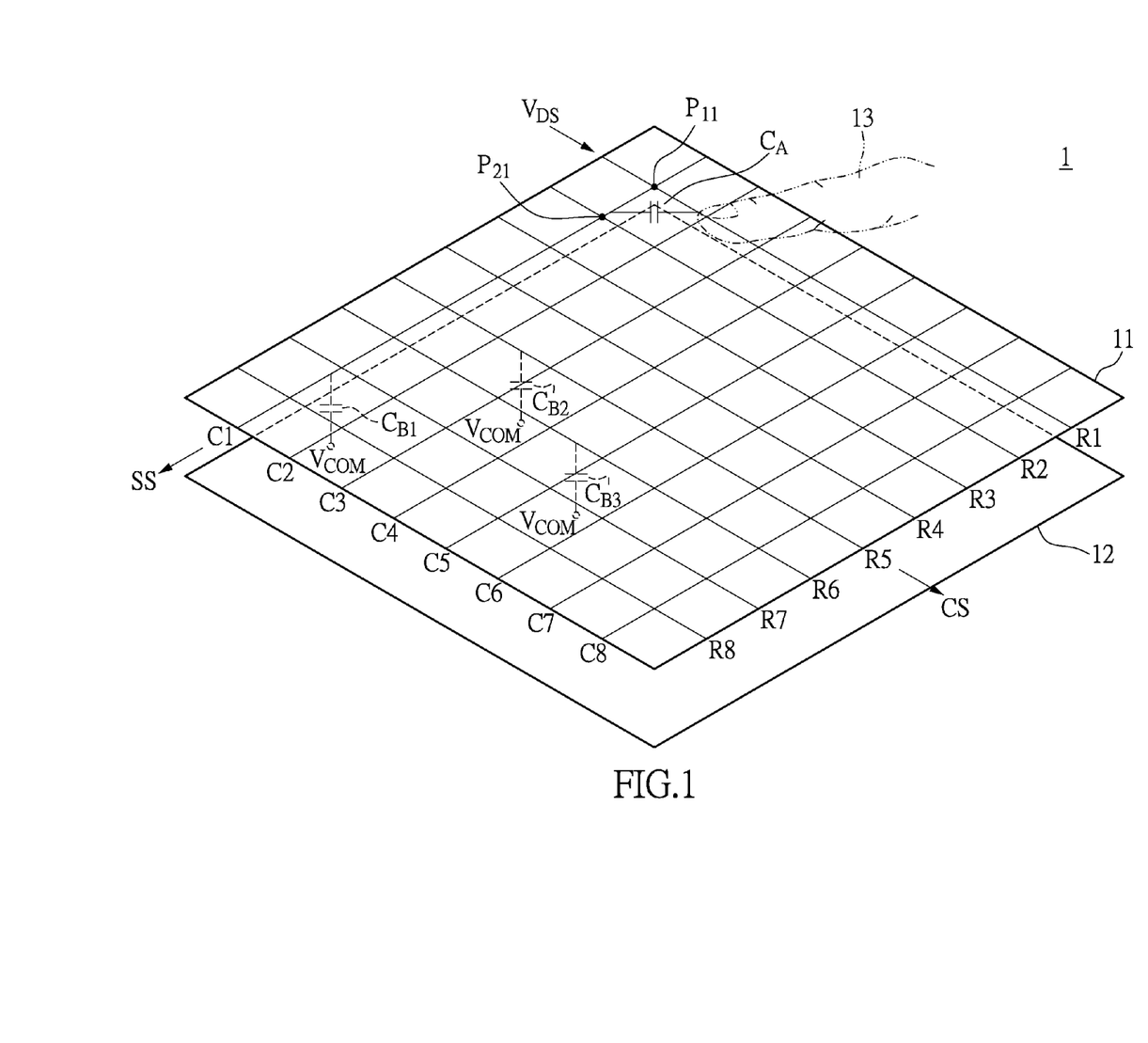
FIG. 1 is a diagram illustrating a touch module of a noise compensating touch panel according to an embodiment of the present disclosure.

Please refer to FIG. 1. FIG. 1 is a diagram illustrating a touch module of a noise compensating touch panel according to an embodiment of the present disclosure. The touch module 1 comprises a touch sensor 11 and a thin-film transistor 12. The touch sensor 11 comprises a plurality of transmission electrodes R1~R8 and a plurality of sensing electrodes C1~C8. Generally, under the condition of that the touch module 1 does not comprise the thin-film transistor 12, when a scanning voltage $V_{DS}$ senses the transmission electrodes R1~R8 of the touch sensor 11 for outputting at least one sensing signal SS at the sensing electrodes C1~C8, the sensing signal SS has a relatively better SNR (signal-to-noise ratio). In other words, as shown in FIG. 1, when a voltage variation, a capacitance variation and/or an electric field variation of the transmission electrodes R1~R8 and the sensing electrodes C1~C8 on the touch sensor 11 are resulted due to a touch action of a finger 13, a touch capacitor $C_A$ is equivalently formed. Hence the sensing signal SS outputted by the sensing electrodes C1~C8 is generated solely according to a capacitance of the touch capacitor $C_A$. Therefore, under the condition of that the thin-film transistor 12 is not present, the sensing signal SS outputted by the sensing electrodes C1~C8 has a relatively higher SNR.

When designing touch panels in practical, however, the touch module 1 comprises the touch sensor 11 and the thin-film transistor 12. As shown in FIG. 1, capacitance noise such as the first parasitic capacitance $C_{B1}$ and the second parasitic capacitance $C_{B2}$ are easily generated between the transmission electrodes R1~R8 and the sensing electrodes C1~C8 of the touch sensor 11. When voltage variation, capacitance variation and/or electric field variation are resulted according to the finger 13 touching the touch sensor 11, capacitance of a touch capacitor $C_A$ is equivalently formed. Hence, in addition to a touch signal generated according to the capacitance of the touch capacitor $C_A$, the sensing signal SS (according to the capacitance of the touch capacitor $C_A$ being sensed and outputted by the sensing electrode C1) further comprises parasitic capacitance noise (e.g. the first parasitic capacitance $C_{B1}$, the second parasitic capacitance $C_{B2}$ and the third parasitic capacitance $C_{B3}$) of mutual capacitance, which is generated by a common voltage $V_{COM}$ of the electrodes and the thin-film transistor 12 of the touch sensor 11.

Figure 2:
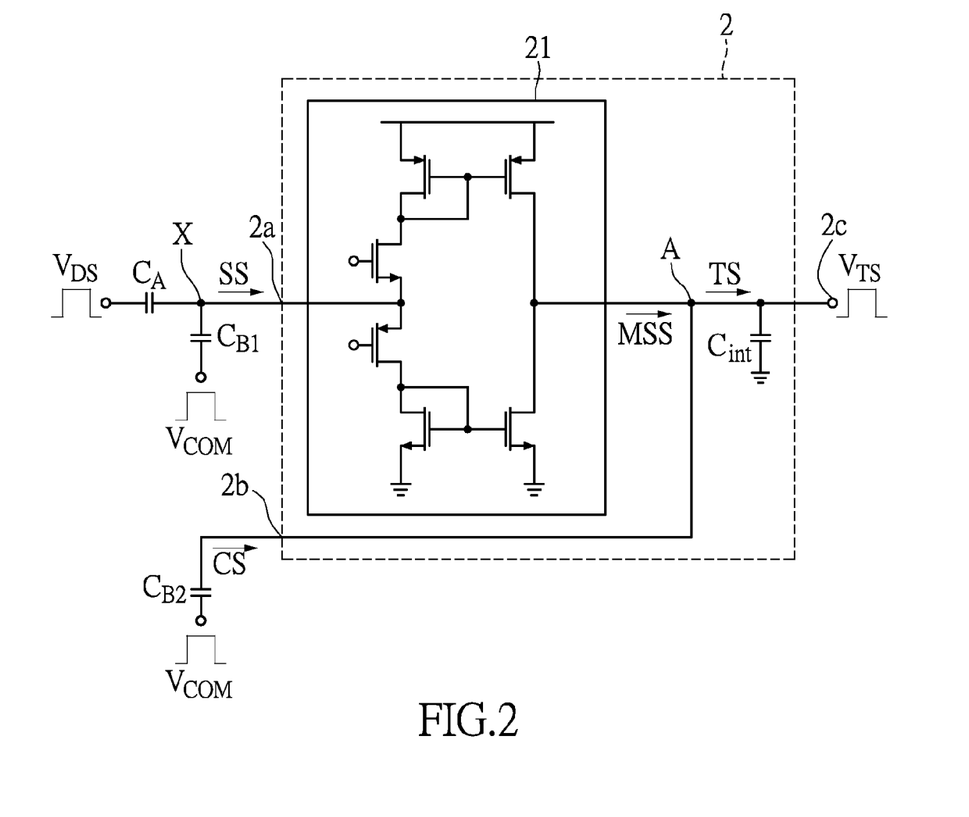
FIG. 2 is a diagram illustrating a signal compensating module according to a first embodiment of the present disclosure.

Please refer to FIG. 1 and FIG. 2 together. FIG. 2 is a diagram illustrating a signal compensating module according to a first embodiment of the present disclosure. The first embodiment of the present disclosure provides a noise compensating touch panel, comprising the touch module 1 and a signal compensating module 2. The touch module 1 comprises the touch sensor 11 and the thin-film transistor 12. The signal compensating module 2 comprises a first input terminal 2a, a second input terminal 2b and an output terminal 2c. The signal compensating module 2 further comprises a first current mirror unit 21 and a capacitor $C_{int}$. A first terminal of the first current mirror unit 21 is coupled to the first input terminal 2a. A second terminal of the first current mirror unit 21 is coupled to the second input terminal 2b. A first terminal of the capacitor $C_1$ is coupled to the second terminal of the first current mirror unit 21. A second terminal of the capacitor $C_{int}$ is grounded. The output terminal 2c is coupled to the first terminal of the capacitor $C_{int}$.

The signal compensating module 2 is coupled to the touch module 1. More specifically, the plurality of transmission electrodes R1~R8 of the touch module 1 are coupled to the second input terminal of the signal compensating module 2. The plurality of sensing electrodes C1~C8 are coupled to the first input terminal 2a of the signal compensating module 2.

Further, a multiplexer (not illustrated) is coupled between the touch module 1 and the signal compensating module 2. The multiplexer comprises a plurality of input terminals and an output terminal, for coupling all sensing electrodes C1~C8 of the touch module 1 to the first input terminal 2a of the signal compensating module 2.

As mentioned above, the capacitances of the touch capacitor $C_A$ and the first parasitic capacitor $C_{B1}$ are merged at a node X to generate the sensing signal SS. When the scanning voltage $V_{DS}$ performs scanning, the first input terminal 2a of the signal compensating module 2 receives the sensing signal SS, and the second input terminal 2b of the signal compensating module 2 receives a compensating signal CS. The compensating signal CS corresponds to a parasitic capacitance (e.g. capacitance of the second parasitic capacitor $C_{B2}$) between the thin-film transistor 12 and one of the transmission electrodes R2~R8 that has not been touched by the finger 13. Phase inversion is performed, via the first terminal of the first current mirror unit 21 of the signal compensating module 2, to the sensing signal SS received by the first input terminal 2a. A mirrored sensing signal MSS is then outputted by the second terminal of the first current mirror unit 21. Subsequently current summation is performed to the mirrored sensing signal MSS outputted and the compensating signal CS received by the second input terminal 2b at a node A, for removing parasitic capacitance (e.g. capacitance of the second parasitic capacitor $C_{B2}$) in the sensing signal SS.

For instance, when the finger 13 touches an crossover node $P_{21}$ of the transmission electrode R2 and the sensing electrode C1 of the touch sensor 11, the sensing electrode C1 outputs the sensing signal SS. At the same time, the transmission electrode R6, which is four transmission electrodes away from the transmission electrode R2 and is not touched by the finger 13, is selected. The transmission electrode R6 is for sensing the compensating signal CS which corresponds to a capacitance of the third parasitic capacitor $C_{B3}$. The transmission electrode R2 is four transmission electrodes away from the transmission electrode R6 (which is selected for sensing the compensating signal CS), so unnecessary noise capacitance caused by coupling capacitance induced between electrodes can be avoided. Similarly, when the scanning voltage $V_{DS}$ scans the transmission electrode R3, the transmission electrode R7 can also be selected to sense the compensating signal CS. When the scanning voltage $V_{DS}$ scans the transmission electrode R5, the transmission electrode R1 is selected to sense the compensating signal CS. This way, the distance of N/2 transmission electrodes is kept between the transmission electrode being used and the transmission electrode for sensing the compensating signal CS. In the embodiment of the present disclosure, the distance of N/2 transmission electrodes is used as an exemplary example. The present disclosure can also be realized with a distance of N/3 or N/4 transmission electrodes and is not limited thereto.

More specifically, parasitic capacitances generated by the common voltage $V_{COM}$ between the electrodes and the thin-film transistor 12 of the touch sensor 11 are equal to each other. Hence when the signal compensating module 2 of the present embodiment scans an crossover node $P_{11}$ (of the transmission electrode R1 and the sensing electrode C1) has been touched by the finger 13 according to the scanning voltage $V_{DS}$, one of the transmission electrodes R2~R8 that have not been touched is scanned, and parasitic capacitance between the electrode of the touch sensor 11 and the thin-film transistor 12 is sensed to be the compensating signal CS. However, the sensing signal SS (outputted by the sensing electrodes C1~C8 due to being touched by the finger 13) not only comprises a touch signal corresponding to the capacitance of the touch capacitor $C_A$, but also the parasitic capacitance (e.g. capacitance of the first parasitic capacitor $C_{B1}$) between the electrode of the touch sensor 11 and the thin-film transistor 12. Therefore, when the signal compensating module 2 has received the sensing signal SS at the first input terminal 2a, the signal compensating module 2 performs phase inversion to the sensing signal SS via the first current mirror unit 21 of the signal compensating module, so as to generate a mirrored sensing signal MSS.

When phase inversion has been performed to the sensing signal SS, a signal corresponding to the capacitance of the first parasitic capacitor $C_{B1}$ comprised in the sensing signal SS is also phase-inverted. Current summation is then performed with the compensating signal CS (generated by the second parasitic capacitor $C_{B2}$ which has the same capacitance as the first parasitic capacitor $C_{B1}$) at the node A. Result of the current summation can cancel out the signal of the phase-inverted first parasitic capacitor $C_{B1}$, for compensating the sensing signal SS and then outputting a determining signal TS. The determining signal TS stores a current of the determining signal TS via the capacitor $C_{int}$, and then measures a determining voltage $V_{TS}$ at the output terminal 2c of the signal compensating module 2.

Figure 3:
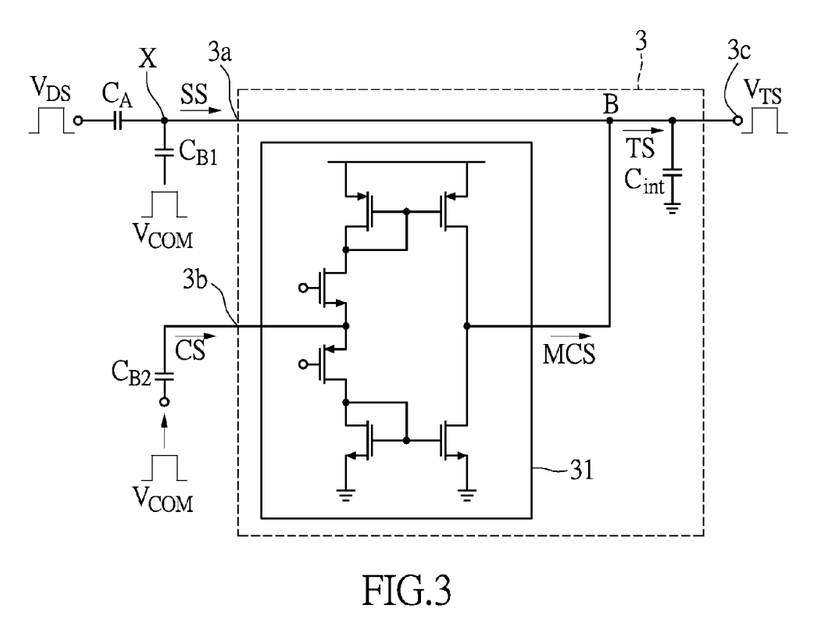
FIG. 3 is a diagram illustrating a signal compensating module according to a second embodiment of the present disclosure.

Please refer to FIG. 3. FIG. 3 is a diagram illustrating a signal compensating module according to a second embodiment of the present disclosure. A difference between embodiments shown in FIG. 3 and FIG. 2 is that, a second current mirror unit 31 of the signal compensating module 3 is coupled to a second input terminal 3b of the signal compensating module 3. Similar to the signal compensating module 2, a first input terminal 3a of the signal compensating module 3 receives a sensing signal SS (outputted by the sensing electrode C1 when the transmission electrode R1 and the sensing electrode C1 are touched by a finger) at a node X. A second input terminal 3b of the signal compensating module 3 receives the compensating signal CS.

The signal compensating module 3 receives the compensating signal CS at the second input terminal 3b, performs phase inversion to the compensating signal CS via a second current mirror unit 31 of the signal compensating module, so as to generate a mirrored compensating signal MCS. By performing current summation to the mirrored compensating signal MCS and the sensing signal SS received by the first input terminal 3a of the signal compensating module 3 at a node B, the signal of the first parasitic capacitor $C_{B1}$ comprised in the sensing signal SS can be canceled out, for compensating the sensing signal SS so as to output the determining signal TS. A current of the determining signal TS is stored via the capacitor $C_{int}$, and a determining voltage $V_{TS}$ is measured at an output terminal 3c of the signal compensating module 3.

Figure 4:
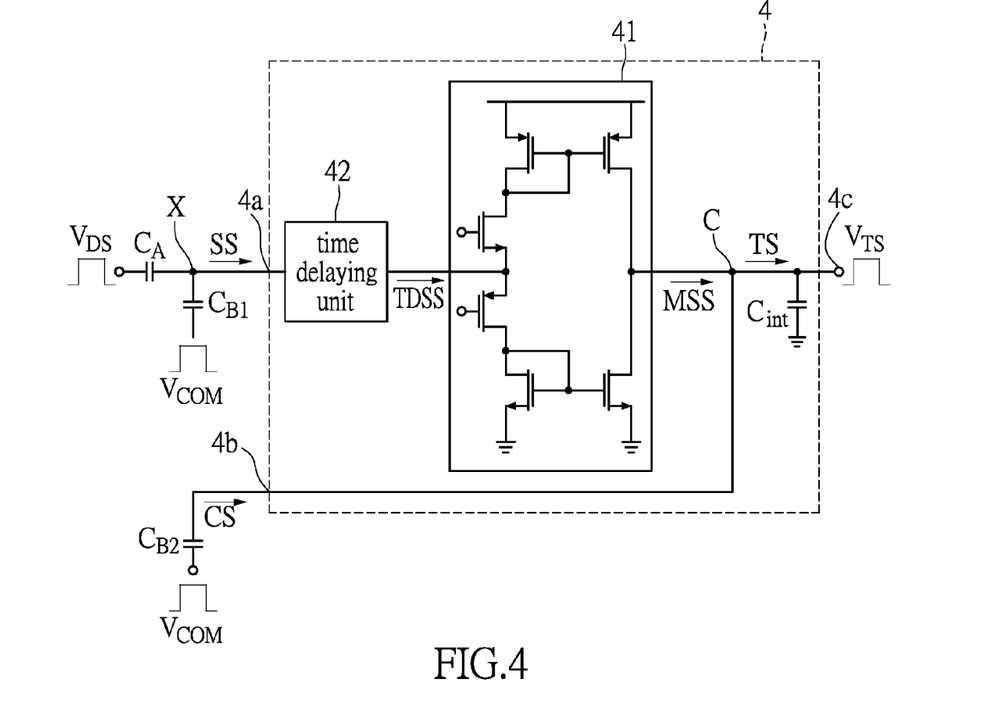
FIG. 4 is a diagram illustrating a signal compensating module according to a third embodiment of the present disclosure.

Please refer to FIG. 2 and FIG. 4 together. FIG. 4 is a diagram illustrating a signal compensating module according to a third embodiment of the present disclosure. A difference between FIG. 4 and FIG. 2 is that the signal compensating module 4 further comprises a time delaying unit 42. The time delaying unit 42 is coupled to a first input terminal 4a of the signal compensating module 4. The time delaying unit 42 is for delaying a sensing signal SS received by the first input terminal 4a, and outputting the delayed sensing signal TDSS to a third current mirror unit 41. In the present embodiment of the present disclosure, the time delaying unit 42 can also be coupled to a second terminal of the third current mirror unit 41. Such embodiments are merely exemplary and the present disclosure is not limited thereto.

More specifically, according to a scanning sequence of the scanning voltage $V_{DS}$, the transmission electrode R1 is scanned to the transmission electrode R8 sequentially. Hence when the scanning voltage $V_{DS}$ scans the transmission electrode R1, a capacitance of the touch capacitor $C_A$ and a capacitance of the first parasitic capacitor $C_{B1}$ generated by the common electrode $V_{COM}$ with respect to the sensing electrode C1 are received at the sensing electrode C1, for generating the sensing signal SS. However when the sensing electrode C1 outputs the sensing signal SS, the scanning voltage $V_{DS}$ has not sensed a capacitance of the second parasitic capacitor $C_{B2}$ of the transmission electrode R5 (which is selected to sense the compensating signal CS). In other words, the time of when the scanning voltage $V_{DS}$ has scanned the capacitance of the first parasitic capacitor $C_{B1}$ is different to that of when the scanning voltage $V_{DS}$ has scanned the capacitance of the second parasitic capacitor $C_{B2}$. Therefore, the first input terminal 4a of the signal compensating module 4 would receive a signal faster than the second input terminal 4b. If capacitance signals of the first parasitic capacitor $C_{B1}$ and the second parasitic capacitor $C_{B2}$ are not received synchronously, the compensating signal CS cannot completely remove the parasitic capacitance in the sensing signal SS when current summation is performed at a node C of the signal compensating module 4. Consequently the determining signal TS cannot be accurately measured at the output terminal 4c.

Figure 5:
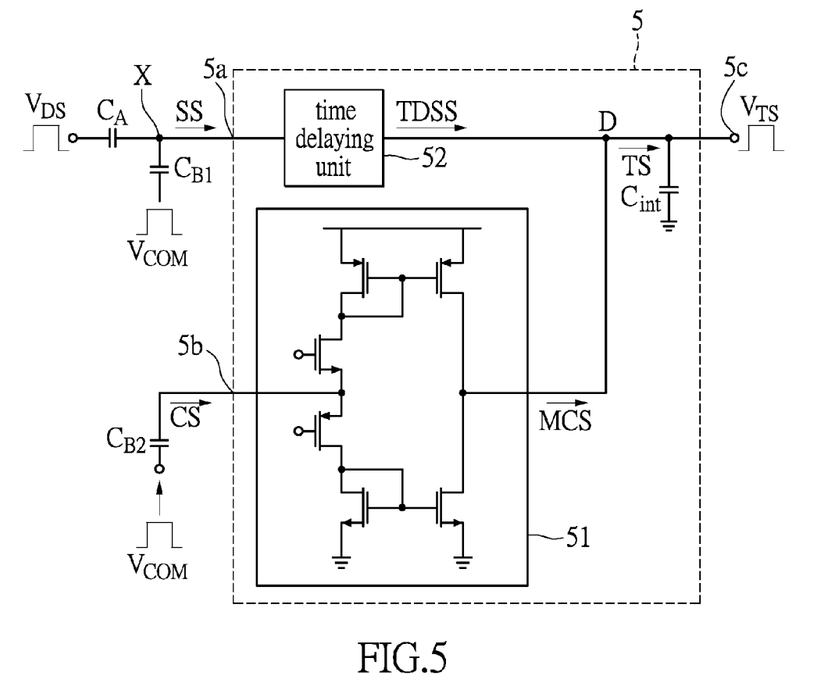
FIG. 5 is a diagram illustrating a signal compensating module according to a fourth embodiment of the present disclosure.

Please refer to FIG. 3 and FIG. 5 together. FIG. 5 is a diagram illustrating a signal compensating module according to a fourth embodiment of the present disclosure. A difference between FIG. 5 and FIG. 3 is that the signal compensating module 5 further comprises a time delaying unit 52. The time delaying unit 52 is coupled to a first input terminal 5a of the signal compensating module 5. The time delaying unit 52 is for delaying the sensing signal SS received by the first input terminal 5a, so as to output a delayed sensing signal TDSS. The time delaying unit 52 is similar to the time delaying unit 42, so relative descriptions are omitted hereinafter.

Figure 6:
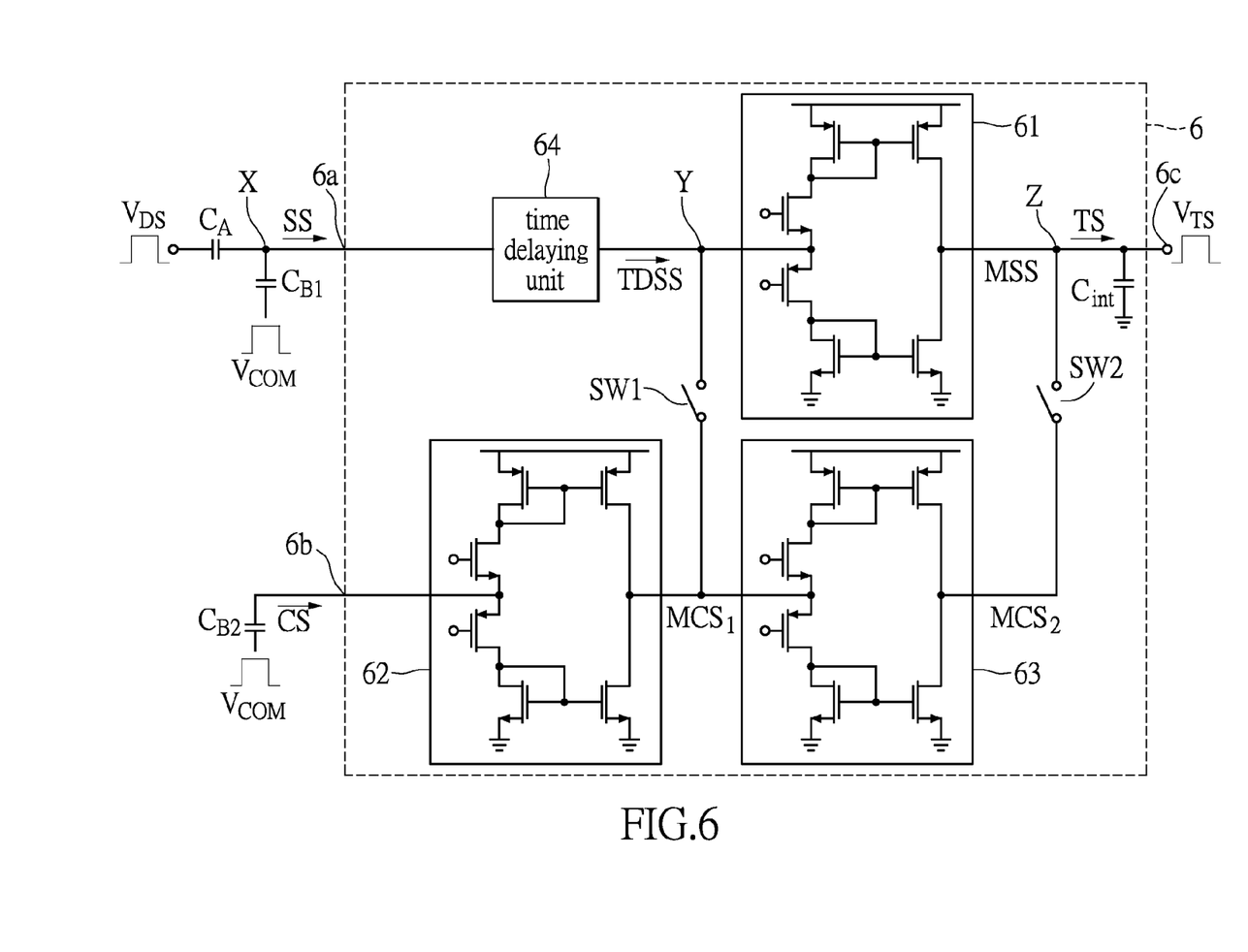
FIG. 6 is a diagram illustrating a signal compensating module according to a fifth embodiment of the present disclosure.

Please refer to FIG. 6. FIG. 6 is a diagram illustrating a signal compensating module according to a fifth embodiment of the present disclosure. The signal compensating module 6 comprises a first input terminal 6a, a second input terminal 6b and an output terminal 6c. The signal compensating module 6 comprises a first current mirror unit 61, a second current mirror unit 62, a third current mirror unit 63, a time delaying unit 64, a switch $SW_1$, a switch $SW_2$ and a capacitor $C_{int}$. A first terminal of the time delaying unit 64 is coupled to the first input terminal 6a. A first terminal of the first current mirror unit 61 is coupled to a second terminal of the time delaying unit 64. A first terminal of the second current mirror unit 62 is coupled to a first terminal of the second input terminal 6b. A first terminal of the third current mirror unit 63 is coupled to a second terminal of the second current mirror unit 62. The second terminal of the time delaying unit 64 is coupled to the second terminal of the second current mirror unit 62 via the switch $SW_1$. A second terminal of the first current mirror unit 61 is coupled to a second terminal of the third current mirror unit 63 via a second switch $SW_2$. A first terminal of the capacitor $C_{int}$ is coupled to the second terminal of the first current mirror unit 61. A second terminal of the capacitor $C_{int}$ is grounded. An output terminal 6c is coupled to the first terminal of the capacitor $C_{int}$.

In the present embodiment, the signal compensating module 6 further performs signal compensation via a plurality of current mirror units. Similarly to the above mentioned embodiments, the first input terminal 6a of the signal compensating module 6 receives a sensing signal SS (outputted by the sensing electrode C1 when the transmission electrode R1 and the sensing electrode C1 are touched by a finger) at the node X. The second input terminal 6b of the signal compensating module 6 receives the compensating signal CS.

However, the present embodiment of the present disclosure differs from the above-mentioned embodiments in that the present embodiment comprises two signal compensating paths. When a signal compensating module 6 selects to turn on the switch $SW_1$, such operation is similar to that of the fourth embodiment as shown FIG. 5. The time delaying unit 64 is coupled to the first input terminal 6a of the signal compensating module 6. The time delaying unit 64 is for delaying a sensing signal SS received by the first input terminal 6a, outputting a delayed sensing signal TDSS and performing current summation to the delayed sensing signal TDSS and a mirrored compensating signal $MCS_1$ at the node Y, for canceling out a signal of the first parasitic capacitor $C_{B1}$ comprised in the sensing signal SS. A mirrored signal is generated when the signal resulted from the current summation at the node Y is passed through the first current mirror unit 61 again. However, since the capacitor $C_{int}$ still stores the current of the determining signal TS accordingly, the value of the determining voltage $V_{TS}$ being measured by the signal compensating module 6 at the output terminal 6c is not affected.

Further, when the signal compensating module 6 selects to turn on the switch $SW_2$, such operation is similar to that of the third embodiment as shown FIG. 4. The time delaying unit 64 is for delaying a sensing signal SS received by the first input terminal 6a, and then outputs a delayed sensing signal TDSS to the first current mirror unit 61. However, a difference to the third embodiment is that the second current mirror unit 62 and the third current mirror unit 63 are coupled to the second input terminal 6b. The compensating signal CS received by the second input terminal 6b passes through the second current mirror unit 62 to generate the mirrored compensating signal $MCS_1$, which is transmitted to the first terminal of the third current mirror unit 63. By utilizing the third current mirror unit 63 to perform the phase inversion to the mirrored compensating signal $MCS_1$ again, a secondary mirrored compensating signal $MCS_2$ is generated. The secondary mirrored compensating signal $MCS_2$ is identical to the original compensating signal CS.

Simply put, by turning on the switch $SW_2$, phase inversion is performed twice to the compensating signal CS, for the compensating signal CS is outputted at the second terminal of the third current mirror unit 63. Current summation is performed to the mirrored sensing signal MSS and the secondary mirrored compensating signal $MCS_2$ (which is equivalent to the compensating signal CS) to generate the determining signal TS. Similarly, the capacitor $C_{int}$ still stores the current of the determining signal TS accordingly, and the value of the determining voltage $V_{TS}$ is measured by the signal compensating module 6 at the output terminal 6c.

In a compensating path of when the switch $SW_1$ is turned on, a current generated at the node Y is in a transient state, which is more difficult to completely remove the parasitic capacitance in the sensing signal SS at the node Y. Hence, in the present embodiment of the present disclosure, a compensating path of the switch $SW_2$ is disposed, and summation is performed to the signal-processed sensing signal SS and the compensating signal CS at a node Z in a steady state, for more accurately removing the parasitic capacitance in the sensing signal SS.

(Embodiment of the Touch Device of the Touch Panel Utilizing the Compensating Signal)

Figure 7:
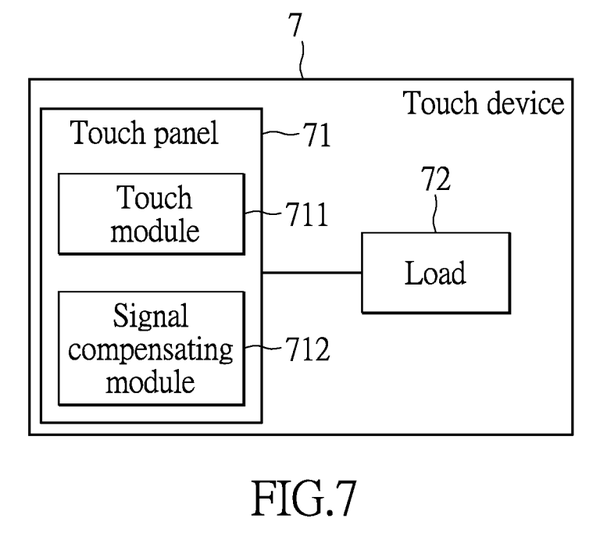
FIG. 7 is a diagram illustrating a touch device of a touch panel utilizing a compensating signal according to an embodiment of the present disclosure.

Please refer to FIG. 7. FIG. 7 is a diagram illustrating a touch device of a touch panel utilizing a compensating signal according to an embodiment of the present disclosure. The touch device 7 comprises a touch panel 71 and a load 72. The touch panel 71 comprises a touch module 711 and a signal compensating module 712. The touch panel 71 of the touch device 7 can be any of the touch panels mentioned in above embodiments of the present disclosure. The load 72 is coupled to the touch panel 71. More specifically, the load 72 is coupled to an output terminal of the touch module. The load 72 receives a determining voltage, for the touch device to perform subsequent operations. For instance, the load 72 can be an arithmetic unit such as a CPU (central processing unit). The CPU receives the determining voltage for performing graphical calculation to determine a position of the touch panel being touched by a user and executing an action corresponding to such touch position.

(Possible Effects of the Present Disclosure)

In summary, when the noise compensating touch panel of the present disclosure utilizes scanning voltage to sequentially scan each transmission electrode, the transmission electrode that has not been touched by object senses mutual capacitance noise generated by the common electrodes between the thin-film transistor and the sensing electrode (or the transmission electrode) on the touch panel, for generating a reference compensating signal. The sensing signal removes noise via the compensating signal, for increasing a signal-to-noise ratio of the sensing signal. Consequently an accuracy of determining the touch position for a capacitive sensing touch panel is improved.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A noise compensating touch panel, comprising:
   a touch module, comprising:
   a plurality of transmission electrodes, for sequentially receiving at least one scanning voltage;
   a plurality of sensing electrodes, for providing at least one sensing signal conveying a first parasitic capacitance when simultaneously the scanning voltage is driven on a first transmission electrode of the transmission electrodes and an object touching at least one crossover node formed by a first transmission electrode and the plurality of sensing electrodes is sensed, wherein the first parasitic capacitance is a mutual capacitance between the sensing electrode and a common electrode;

wherein when the scanning voltage is driven on a second transmission electrode, and the second transmission electrode is not touched by the object, the capacitance of a second parasitic capacitor is measured from the second transmission electrode for providing a compensating signal, wherein the capacitance of the second parasitic capacitance is the mutual capacitance between the second transmission electrode and the common electrode; and a signal compensating module, coupled to the touch module, the signal compensating module comprising a first input terminal, a second input terminal and an output terminal, wherein the first input terminal and the second input terminal receive the sensing signal and the compensating signal respectively, for providing a determining voltage at the output terminal.

2. The touch panel according to claim 1, wherein the signal compensating module comprises:

a time delaying unit, coupled to the first input terminal, for delaying the sensing signal generated by the sensing electrode and providing at least one delayed sensing signal.

3. The touch panel according to claim 1, wherein the signal compensating module comprises:

a first current mirror unit, comprising a first terminal and a second terminal, the first terminal is coupled to the first input terminal of the signal compensating module, for performing phase inversion to the sensing signal received, and generating a mirrored sensing signal at the second terminal of the first current mirror unit.

4. The touch panel according to claim 3, wherein the second input terminal of the signal compensating module is coupled to the second terminal of the first current mirror unit, for applying the compensating signal received to the mirrored sensing signal and generating a determining signal having the determining voltage.

5. The touch panel according to claim 1, wherein the signal compensating module comprises a second current mirror unit, comprising a first terminal and a second terminal, the first terminal is coupled to the second input terminal, for performing phase inversion to the compensating signal received and generating a mirrored compensating signal at the second terminal of the second current mirror unit.

6. The touch panel according to claim 5, wherein the signal compensating module couples the first input terminal to the second terminal of the second current mirror unit, for applying the mirrored compensating signal received to the sensing signal, and generating the determining signal.

7. The touch panel according to claim 1, wherein the second transmission electrode of the touch module is in a fixed distance away from the first transmission electrode of the touch module.

8. The touch panel according to claim 1, wherein the fixed distance is half the number of transmission electrodes of the touch module.

9. The touch panel according to claim 1, wherein the capacitance of the first parasitic capacitor equals the capacitance of the second parasitic capacitor.

10. A touch device, comprising:
a touch panel, comprising:
a touch module, comprising:
a plurality of transmission electrodes, for sequentially receiving at least one scanning voltage;

a plurality of sensing electrodes, for providing at least one sensing signal conveying a first parasitic capacitance when simultaneously the scanning voltage is driven on a first transmission electrode of the transmission electrodes and an object touching at least one crossover node formed by a first transmission electrode and the plurality of sensing electrodes is sensed, wherein the first parasitic capacitance is a mutual capacitance between the sensing electrode and a common electrode;

wherein when the scanning voltage is driven on a second transmission electrode, and the second transmission electrode is not touched by the object, the capacitance of a second parasitic capacitor is measured from the second transmission electrode for providing a compensating signal, wherein the capacitance of the second parasitic capacitance is the mutual capacitance between the second transmission electrode and the common electrode; and a signal compensating module, coupled to the touch module, the signal compensating module comprising a first input terminal, a second input terminal and an output terminal, wherein the first input terminal and the second input terminal receive the sensing signal and the compensating signal respectively, for providing a determining voltage at the output terminal; and a load, coupled to the touch panel, for receiving the determining voltage to operate.

11. The touch device according to claim 10, wherein the signal compensating module comprises:

a time delaying unit, coupled to the first input terminal, for delaying the sensing signal generated by the sensing electrode and providing at least one delayed sensing signal.

12. The touch device according to claim 10, wherein the signal compensating module comprises:

a first current mirror unit, comprising a first terminal and a second terminal, the first terminal is coupled to the first input terminal of the signal compensating module, for performing phase inversion to the sensing signal received, and generating a mirrored sensing signal at the second terminal of the first current mirror unit.

13. The touch device according to claim 12, wherein the second input terminal of the signal compensating module is coupled to the second terminal of the first current mirror unit, for applying the compensating signal received to the mirrored sensing signal and generating a determining signal.

14. The touch device according to claim 10, wherein the signal compensating module comprises a second current mirror unit, comprising a first terminal and a second terminal, the first terminal is coupled to the second input terminal, for performing phase inversion to the compensating signal received and generating a mirrored compensating signal at the second terminal of the second current mirror unit.

15. The touch device according to claim 14, wherein the signal compensating module couples the first input terminal to the second terminal of the second current mirror unit, for applying the mirrored compensating signal received to the sensing signal, and generating the determining signal.

16. The touch device according to claim 10, wherein the second transmission electrode of the touch module is in a fixed distance away from the first transmission electrode of the touch module.

17. The touch device according to claim 10, wherein there is an interval between adjacent transmission electrodes, and the fixed distance is equal to half length of sum of all intervals.

18. The touch device according to claim 10, wherein the capacitance of the first parasitic capacitor equals the capacitance of the second parasitic capacitor.

* * * * *